(12) United States Patent
Deakin

(10) Patent No.: US 7,174,242 B2
(45) Date of Patent: Feb. 6, 2007

(54) SHIP MOTION PREDICTOR

(75) Inventor: Anthony Michael Deakin, Rowlands Castle (GB)

(73) Assignee: BAE Systems (Combat and Radar Systems) Limited, Jersey (GB)

( * ) Notice: Subject to any disclaimer, the term of this patent is extended or adjusted under 35 U.S.C. 154(b) by 346 days.

(21) Appl. No.: 10/504,526

(22) PCT Filed: Jan. 30, 2003

(86) PCT No.: PCT/GB03/00439

§ 371 (c)(1),
(2), (4) Date: Aug. 16, 2004

(87) PCT Pub. No.: WO03/068589

PCT Pub. Date: Aug. 21, 2003

(65) Prior Publication Data

US 2005/0102072 A1   May 12, 2005

(30) Foreign Application Priority Data

Feb. 16, 2002 (GB) .................................. 0203688.7

(51) Int. Cl.
*H01Q 1/18* (2006.01)
*B63B 49/00* (2006.01)

(52) U.S. Cl. ........................ 701/21; 701/213; 701/215; 342/359; 318/648

(58) Field of Classification Search .................. 701/21, 701/213, 214, 215, 221; 342/359, 165, 174, 342/458, 357.06, 357.08, 357.11; 343/700 R, 343/709; 318/638, 648
See application file for complete search history.

(56) References Cited

U.S. PATENT DOCUMENTS

| | | | | |
|---|---|---|---|---|
| 4,823,134 A | * | 4/1989 | James et al. | 342/359 |
| 5,172,323 A | | 12/1992 | Schmidt | |
| 5,933,110 A | * | 8/1999 | Tang et al. | 342/357.11 |
| 6,249,247 B1 | * | 6/2001 | Inugai et al. | 342/359 |
| 6,313,788 B1 | * | 11/2001 | Wilson | 342/357.11 |
| 6,720,911 B2 | * | 4/2004 | Saucier | 342/174 |

FOREIGN PATENT DOCUMENTS

| | | |
|---|---|---|
| GB | 774483 | 8/1952 |
| WO | WO 83/01681 | 5/1983 |
| WO | WO 98/45892 | 10/1998 |

* cited by examiner

*Primary Examiner*—Tan Q. Nguyen
(74) *Attorney, Agent, or Firm*—Crowell & Moring LLP

(57) ABSTRACT

There is disclosed a predictive filter for predicting the future position of a look direction of a rotating directional antenna mounted on a vessel. Prediction of a look direction of the antenna at any instant is made from input of ship's compass data including roll data, pitch data and heading data, as well as data describing a rotational position of the antenna, output from an antenna synchro device. Smoothing of the digital roll, pitch and heading data and antenna position data is followed by application of a moving time window, filter which removes any offset from the data within of the moving time window to produce data having a zero mean. The zero mean data is input into an auto-regression algorithm, the output of which is combined with mean roll, pitch, heading, position and antenna velocity data to obtain predicted positions of the antenna relative to the vessel, and a predicted motion of the vessel. The combined vessel motion prediction and antenna position and velocity prediction can be used to establish a predictive future look direction of the antenna for a period of between 0.1 and 5 seconds into the future.

17 Claims, 15 Drawing Sheets

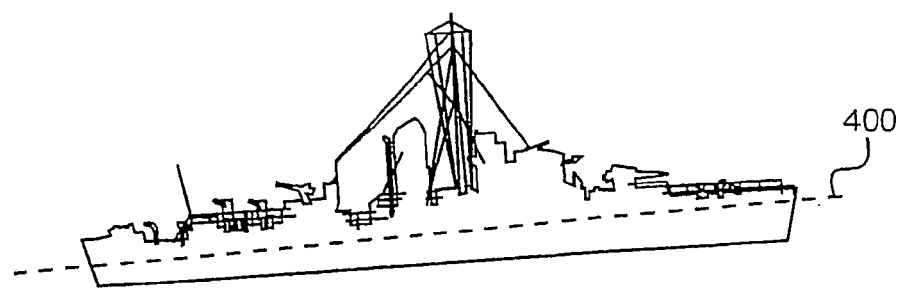
Fig. 4a    Pitch
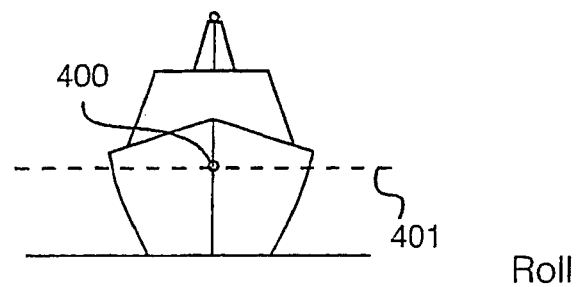
Fig. 4b    Roll
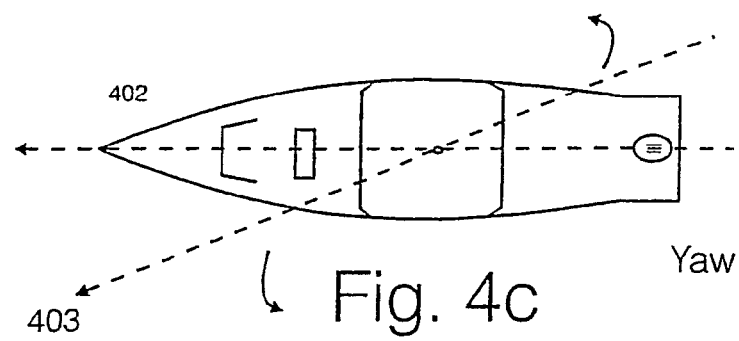
Fig. 4c    Yaw
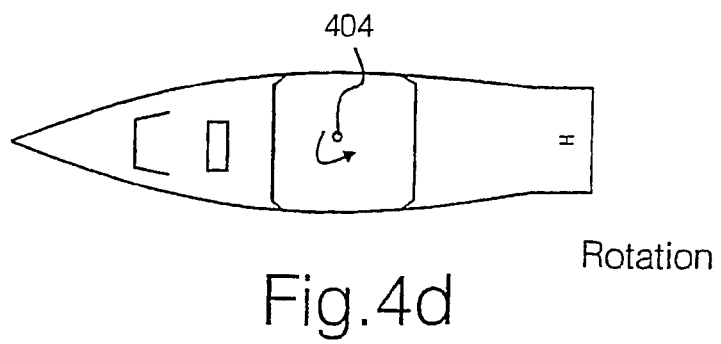
Fig. 4d    Rotation

SHIP MOTION PREDICTOR

FIELD OF THE INVENTION

The present invention relates to motion prediction for a vehicle, particularly, but not exclusively a marine vessel.

BACKGROUND TO THE INVENTION

Sea going vessels, particularly ships, are fitted with radar early warning systems which warn of approaching vehicles, including aircraft and surface vessels, within a range of the ship's radar. The radar needs to accurately establish the position of vehicles within the radar range relative to the ship in three dimensions. Typically, in some circumstances, some radars cannot be mechanically stabilized, because a stabilizer is too heavy and too expensive on top of a main mast of a typical ship.

Typically, the positions of vehicles are determined along a "look" of the radar. Such a look comprises a radar transmission along a particular direction in space relative to the ship. Each direction is defined by angles with respect to a central axis of a radar antenna. Therefore, to determine the direction it is essential to know an exact attitude of the antenna axis at the moment of such a transmission. It takes time to point a radar beam in relation to the antenna axes, and "looks" can only be executed during future windows of visibility. Therefore, there is a requirement that the radar must predict the future direction of targets with respect to the antenna axes.

A number of prior published papers exist on the subject of ship motion prediction. However, much of the prior art literature addresses the problem of predicting the orientation of an air craft carrier in order to assist air craft landings. The particular problems of prediction of an antenna look direction are not well addressed in the prior art. The following figures explain some of the problems in prediction of an antenna look direction.

Referring to FIG. 1, there is illustrated schematically in perspective view from above and one side, a conventional surface ship 100 having mounted upon a central tower 101, a radome 102, containing a radar antenna. Typically the antenna is mounted on a rotating platform, which rotates about a nominally vertical axis, when the ship is in horizontal attitude on a calm sea.

Referring to FIG. 2 herein, there is illustrated schematically a prior art rotating antenna 200, mounted within a radome 201. The radome acts as a weather proof covering for the rotating antenna 200. The radome is transparent to radar signals.

Referring to FIG. 3 herein, there is illustrated schematically in cut-away view the rotating antenna, in a direction perpendicular to a vertical axis and to a "look" direction of the antenna. The antenna comprises a rotating platform 300, which, in this example, contains first and second antenna apertures 301, 302 respectively having respective first and second look directions pointing away from each other. As the platform 300 rotates within the radome, about a central axle 303, a central look direction of each antenna aperture sweeps an arc around a main rotational axis of the central axle. The look direction is towards the horizon and angled slightly skywards.

Referring to FIG. 4a herein, there is illustrated schematically a ship undergoing a degree of pitch. A main central longitudinal axis 400 of the ship which is horizontal when the ship is on perfectly flat calm sea, tilts with respect to true horizontal, as the ship's bow dips into troughs, and rises through waves.

Referring to FIG. 4b herein, there is illustrated a roll motion of a ship. The ship rolls from side to side when on rough sea, in which case the ship rotates about the central longitudinal axis 400 of the ship, such that a transverse axis which, when the ship is sailing on true flat calm sea is horizontal, and which forms a plane 401 with the longitudinal axis, tilts away from a true horizontal plane parallel to the earth's surface.

Referring to FIG. 4c herein, there is illustrated schematically a yaw motion of a ship. Yaw occurs where a direction of the main longitudinal axis throughout the ship deviates from a projected straight ahead direction 402, due to movement of the ship, such that the main fore—aft longitudinal axis of the ship points in a different direction 403, as the ship is influenced by sea conditions.

FIG. 4d illustrates schematically a rotation motion of an antenna rigidly and rotatably attached to a super structure of the ship. Rotational motion is about a main upright axis, which, under true flat sea conditions projects vertically upwards and perpendicular to a main flat horizontal plane of the earth's surface. The main central axis of rotation may deviate from true vertical due to pitch, roll and yaw of the ship as illustrated in FIGS. 4a–4c herein above, as rotational movement of the antenna occurs around the axis of rotation 404. Further, the rate of rotation of the antenna about its axis may have slight variations from a constant rate.

Referring to FIG. 5 herein, there is illustrated schematically in plan view a "footprint" of a radar beam produced from a directional antenna, mounted on a ship. The lines shown indicate a −3 dB level of first and second directional beams corresponding to the first and second apertures respectively. The directional beams correspond to receive beams of the antenna and the −3 dB level represents a −3 dB drop in sensitivity from a peak sensitivity level along a main look direction 500, 501 of each beam respectively. As the antenna platform rotates, the beams sweep a field of view, for example looking towards a horizon and towards the sky slightly, rotating around the central axle of the antenna platform, causing the beam to sweep with a field of view across the horizon. Typically, the antenna platform may rotate at around 180 degrees per second (30 revolutions per minute), and the ship may rotate at up to 20 degrees per second. Translations of the ship (heave, surge and crab) are unimportant as far as operation of the ship's radar is concerned.

The radar requires 0.1 s predictions for look execution, that is an accuracy of better than 0.1 degrees RMS, and up to 5 s predictions for look scheduling, that is an accuracy of 2 degrees RMS. The angular accuracy required for look execution is equivalent to 0.5 ms and the angular accuracy for look scheduling is equivalent to 10 ms. At any instant, there is a queue of looks which must be performed in the near future. These are defined in terms of their geographical directions, their wave forms and their preferred intervals of execution. Looks may be assigned to different tasks, for example track maintenance, surveillance, and up link, and so some tasks are intrinsically more important than others. The antenna has various blind arcs, for example two 60 degree (⅓ second) arcs which rotate with the antenna, and prohibit arcs associated either with the ship's structure or geographical sectors.

A scheduler calculates future windows of visibility from the blind arcs using predicted motions of the antenna. The scheduler decides which of the defined looks is both possible and most urgent. It then specifies the future time of execution of that look. A measure of urgency is defined in terms of: priority (intrinsic importance); the relation of "now" to the overlap of the preferred interval execution, and windows of visibility; and the slew angle of the beam.

Referring to FIG. 6 herein, there is illustrated schematically the same beam pattern of the antenna, as viewed from the ship. The beams have a field of view looking out horizontally and slightly upwards towards the horizon, when the ship is travelling steadily and is level on a calm sea (sea state zero).

Since the central axle of the antenna platform is mounted rigidly to the ship's superstructure, then provided the ship remains horizontal and level, the axis of rotation remains vertical. However, as the ship rolls and pitches in rougher sea, the superstructure sways around. Because the central rotational axis of the antenna is in fixed relation to the ship's superstructure, at any instant, the beam may point in a different direction to the nominal look direction if the ship were in true horizontal level attitude and travelling on a constant heading.

Referring to FIG. 7 herein, there is illustrated schematically at an instant in time, a range of variations 700 from an ideal nominal look direction 701 which may be experienced by an antenna aperture of an antenna as shown in FIGS. 2 and 3, as the ship rolls, pitches and yaws away from true horizontal attitude.

Illustrated is a view of a horizon along an antenna look direction seen from a ship's mast head, where the radome is positioned. A variation of up to plus or minus 8 degrees in lateral spread from a nominal look direction 701 may be experienced due to movement of the ship on the seas surface. Similarly, a vertical deviation from the look direction of plus or minus 6 degrees may be experienced in rough conditions. Combinations of vertical and horizontal deviation from nominal look direction may be experienced, giving rise to a field of variation of the look direction which is approximately elliptical as shown in FIG. 7.

Where for example the radar is used for location of incoming air craft, unless the movement of the ship relative to the sea's surface is corrected for, the radar can give misleading positioning of incoming aircraft, having a wide range of fluctuation of bearing from the ship.

Prior art algorithms for antenna look direction prediction are generally not successful, and all evoke a "modeling" principle. That is, given a detailed specification of a ship they set up, force-motion differential equations that take into account inertia of the ship and adjacent water, stiffness (floatation) and damping (wave making due to movement). They represent typical sea force spectra by rational approximations and derived differential equations which, when driven by white noise, imitate wave forces applied to a ship. The prior art models then couple two sets of differential equations and use them for a predictive step in an extended Kalman filter.

Prior art models of this kind are inflexible as well as complicated to set up. Ships change configuration during their lives, and sea state changes occur all the time. Also, some of the effects of the prior art prediction models are speed dependent.

SUMMARY OF THE INVENTION

Specific implementations according to the present invention aim to provide prediction of a vehicle's position in space, relative to a flat earth's surface, for a time period into the immediate future. In the best mode implementation the embodiments are optimized for predicting motion of a sea going vessel, for example a ship. Having predicted the motion of the vehicle, algorithms can be applied to a radar measurement result from an antenna of a vehicle moving away from perfectly horizontal attitude, to make corrections for motion of the vehicle away from true horizontal and apply those corrections to the resulting data received from a radar of the vehicle.

The corrected data can be used for various applications, including electronically stabilizing sensors and weapons on board a vehicle, and assisting air craft landing onto a vehicle.

Specific implementations according to the present invention aim to predict an attitude of a rotating antenna, for a period of between 0.1 seconds and 5 seconds into the future, so that corrections for a deviation of actual look direction from nominal look direction can be obtained. The prediction data can be used to make corrections and adjustments to radar data, or to assist in aircraft landing on a vehicle.

The motion prediction filter disclosed herein uses a different approach to the known prior art Kalman filter models. In the presently disclosed approach, learning algorithms are applied to various linear representations. These continuously adjust coefficients of an auto-regression algorithm, so as to minimize the root mean square differences between future measurements and predictions based on current measurements. Under constant conditions, errors become small and random and there is then no further change in the coefficients.

As a consequence, the motion prediction methods and apparatus disclosed herein adapt to slow changes in sea state and ship's configuration and may be mounted in any type of ship.

Main components of the filter systems disclosed herein operate by predicting motion by acting on data windows of fixed duration and numbers of measurements. These windows start "now" and end in the past. The starts move in steps of the sampling period.

A single channel filter is allocated separately to each degree of freedom of the vehicle, for example roll, pitch, heading, as well as antenna rotation. The filters each comprise a series of compounds of standard types: a polynomial based (Savitski-Gollay) least squares filter; a travelling mean filter; and an auto-regressive (AR) filter.

In the best mode implementation the prediction is implemented by means of a filter device, which accepts heading data, pitch data and roll data from a ship's compass, together with rotation information data from a synchro on a rotating antenna.

According to a first aspect of the present invention there is provided a method of predicting an orientation of a vessel, said method comprising the steps of:

inputting roll data describing a roll of said vessel;

inputting pitch data describing a pitch of said vessel;

inputting heading data describing a heading of said vessel;

applying a travelling mean window to said roll data, pitch data and heading data to obtain a time moving average roll data, time moving average pitch data; and time moving average heading data;

filtering any offset data of said time moving average roll data, time moving average pitch data and time moving average heading data, such that said time moving average roll data, pitch data and heading data has a zero mean value;

applying an auto-regression process to said zero mean time moving average roll data, pitch data and heading data;

predicting angles of movement of major three dimensional X, Y and Z axes of said vessel from an output of said auto-regression process, and said mean roll data, pitch data and heading data; and storing a result of said predicted angles as a set of rotation matrix data.

According to a second aspect of the present invention there is provided a method of predicting a true orientation of an antenna, said antenna rotatably mounted on a vehicle, said method comprising the steps of:

inputting a stream of antenna rotation data describing a current measurement of a rotational position and rotational velocity of said antenna with respect to said vehicle;

applying a moving time window sample to said antenna rotation data to obtain a time moving average antenna rotation data;

filtering any offset data of said time moving average antenna rotation data, such that said time moving average antenna rotation data has a zero mean value;

applying auto-regression to said zero mean time moving average antenna rotation data;

predicting a mean antenna rotation data;

predicting an orientation of major three dimensional X, Y and Z axes of said vehicle; and storing a result of said predicted vehicle orientation and predicted antenna rotation as a set of rotation matrix data, said rotation matrix data describing a predicted antenna position in relation to a set of geographical axes fixed relative to the earth.

According to a third aspect of the present invention there is provided an apparatus for predicting an orientation of a vessel, said apparatus comprising:

a roll data generator for generating roll data describing a roll of said vessel;

a pitch data generator for generating pitch data describing a pitch of said vessel;

a heading data generator for generating heading data describing a heading of said vessel;

a sampler for applying a moving time window sample to said roll data, pitch data and heading data to obtain a time moving average roll data, pitch data and heading data;

at least one filter for filtering any offset data of said time moving average roll data, pitch data and heading data, such that said time moving average roll data, pitch data and heading data has a zero mean value;

at least one auto-regressor for applying auto-regression to said zero mean time moving average roll data, pitch data and heading data;

at least one angle predictor for predicting angles of movement of major X, Y and Z three dimensional axis of said vessel from an output of said auto-regression, and a mean roll data, pitch data and heading data; and a memory device for storing a result of said predicted angles as a set of rotation matrix data.

According to a fourth aspect of the present invention there is provided an apparatus for predicting an orientation of a rotating antenna mounted on a vessel, said apparatus comprising:

an antenna position data generator for generating an antenna rotation position data;

a sampler for applying a moving time window sample to said antenna position data to obtain a time moving average antenna position data;

at least one filter for filtering any offset data of said time moving average antenna position data, such that said time moving average antenna position data has a zero mean value;

at least one auto-regressor for applying auto-regression to said zero mean time moving average antenna position data;

at least one predictor for predicting a mean antenna position data; and a memory device for storing a result of said predicted mean antenna position data as a set of rotation matrix data.

According to a fifth aspect of the present invention there is provided an apparatus for predicting an orientation of an antenna, said apparatus comprising:

an antenna velocity data generator for generating an antenna velocity data;

a sampler for applying a moving time window sample to said antenna velocity data to obtain a time moving average antenna velocity data;

at least one filter for filtering any offset data of said time moving average antenna velocity data such that said time moving average antenna velocity data has a zero mean value;

at least one auto-regressor for applying auto-regression to said zero mean time moving average antenna velocity data;

at least one predictor for predicting a mean antenna velocity data; and a memory for storing a result of said predicted mean antenna velocity data as a set of rotation matrix data.

According to a sixth aspect of the present invention there is provided an apparatus for predicting an orientation of a vessel, said apparatus comprising:

a roll data generator for generating roll data describing a roll of said vessel;

a pitch data generator for generating pitch data describing a pitch of said vessel;

a heading data generator for generating heading data describing a heading of said vessel;

a sampler for applying a moving time window sample to said roll data, pitch data and heading data to obtain a time moving average roll data, pitch data and heading data;

a filter for filtering any offset data of said time moving average roll data, pitch data and heading data, such that said time moving average roll data, pitch data and heading data has a zero mean value;

an auto regressor for applying auto-regression to said zero mean time moving average roll data, pitch data and heading data;

an angle predictor for predicting angles of movement of major X, Y and Z three dimensional axes of said vessel from an output of said auto-regression, and a mean roll data, pitch data and heading data;

a memory device for storing a result of said predicted angles as a set of rotation matrix data;

an antenna rotation data generator for generating an antenna rotation data;

a sampler for applying a moving time window sample to said antenna rotation data to obtain a time moving average antenna rotation data;

at least one filter for filtering any offset data of said time moving average antenna rotation data such that said time moving average antenna rotation data has a zero mean value;

at least one auto-regressor for applying auto-regression to said zero mean time moving average antenna rotation data;

at least one predictor for predicting a mean antenna rotation data; and a memory device for storing a result of said predicted mean antenna rotation data as a set of rotation matrix data.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 4a illustrates schematically a pitch movement of a ship;

FIG. 4b illustrates schematically a roll movement of a ship;

FIG. 4c illustrates schematically a yaw movement of a ship;

FIG. 4d illustrates schematically an antenna rotation movement of an antenna mounted on a ship;

DETAILED DESCRIPTION OF THE BEST MODE FOR CARRYING OUT THE INVENTION

There will now be described by way of example the best mode contemplated by the inventor for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Whilst in the following description, a best mode implementation is described with respect to a ship's radar, the methods and apparatus disclosed are not restricted to a ship's radar but may be applied to any rotating antenna of any type of vehicle and the scope of the invention is limited only by the wording of the claims herein.

In this specification, the term "pitch" is used to mean rotation of a ship about a transverse horizontal axis of the ship.

In this specification, the term "roll" is used to mean rotation of a ship about a longitudinal horizontal axis of the ship.

In this specification, the term "yaw" is used to mean the rotation of a ship about a vertical axis of the ship as a departure from a mean heading.

In this specification, the term "heading" is used to mean a track azimuth of a ship with respect to a compass north.

In this specification, the term "antenna centered coordinates" is used to mean Cartesian coordinates fixed in a face of an antenna, one for each face of the antenna, and aligned with the face.

In the best mode, there is provided a motion prediction filter which operates on a stream ship's compass data, including roll data, pitch data and heading data, and applies various data processing operations including smoothing, estimation and prediction, and data rate reduction on that data stream.

Rotation data from an antenna synchro is also processed, and is smoothed, estimated/predicted, differentiated, and has its data rate reduced, to result in a zero mean rotation data output.

There is provided a separate linear learning filter channel for each of four data channels i.e. for each of roll data, pitch data, heading data and rotation data. That is, there is provided a roll data filter channel, a pitch data filter channel, a heading data filter channel and an antenna rotation data filter channel.

Figure 8:
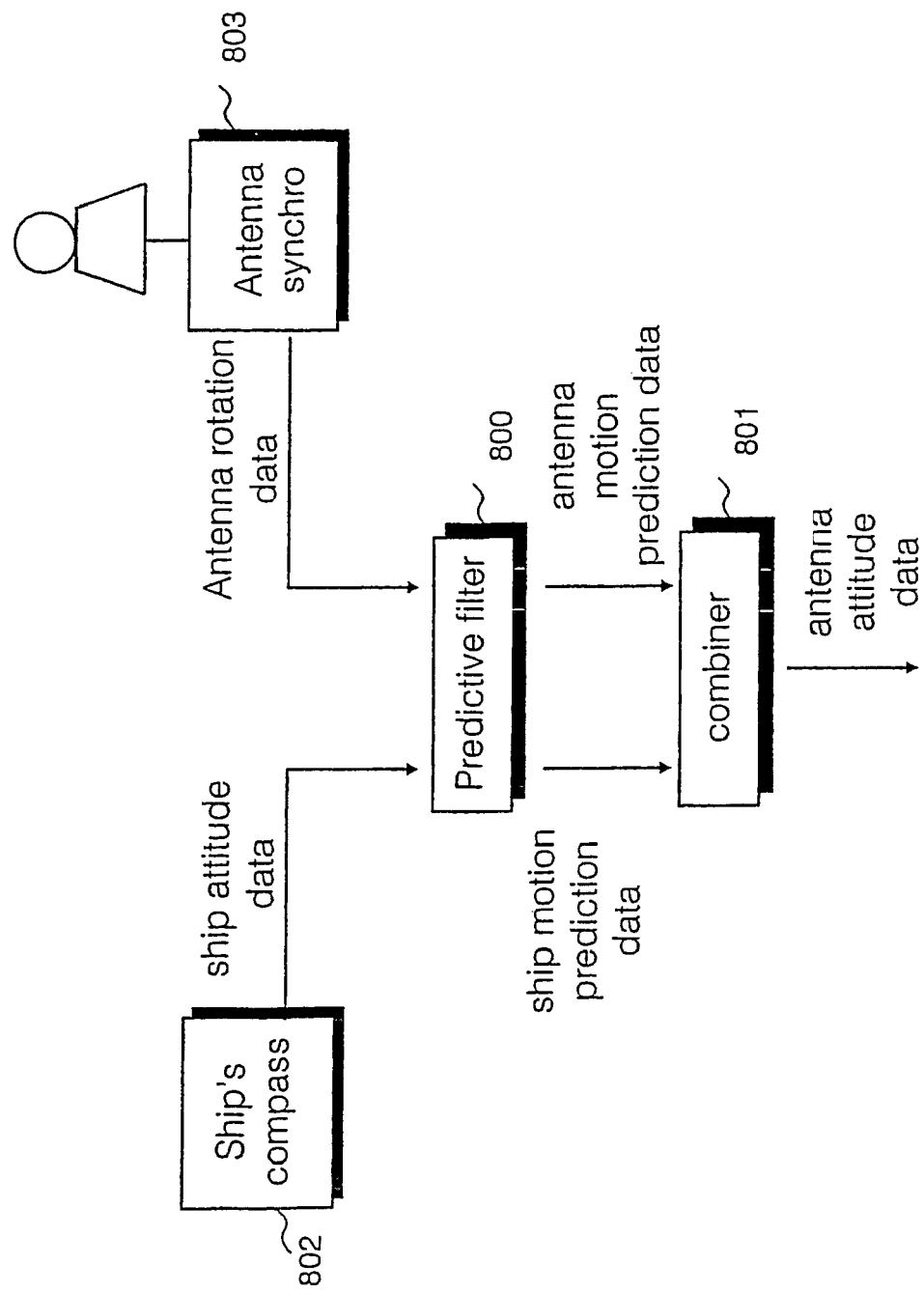
FIG. 8 illustrates schematically components of a motion prediction system of a vehicle according to a specific implementation of the present invention.

Referring to FIG. 8 herein, there is illustrated schematically a system for generating predictions of ship's motion and antenna motion from an output of a ship's compass and an antenna synchro. The system comprises a predictive filter 800 and a combiner 801.

Predictive filter 800 comprises a ship's motion filter, and an antenna motion filter. The ship's motion filter comprises the roll data filter channel, the pitch data filter channel, and the header data filter channel. The antenna motion filter comprises the antenna rotation data filter channel. Each filter channel has three stages comprising conditioning, prediction and interpolation, and each filter channel is characterised by a set of parameters. The filters are trained, that is the parameters are estimated, so as to minimize the errors of prediction. Training is continuous. The filter channels therefore adapt to changes in a sea state and a ship's configuration. Each filter channel is trained on the content of a long data window, for example 50 samples, so as to minimize a root mean square (RMS) error on a single step, for example one sample prediction within that window. The long data window moves in short steps, for example one sample. The filters are retrained after each move.

Digital predictive filter 800 receives an input of ship's attitude data from a known ship's compass 802, and receives antenna rotation data specifying a rotational position of a rotating platform of an antenna, from a known antenna synchro device 803. From the ship's attitude data and antenna rotation data, the predictive filter 800 generates ship motion prediction data and antenna motion prediction data, which predicts movements of the ship and antenna look directions for time periods typically in the range 0.1 to 5 seconds into the future. The predicted antenna rotation is combined with the predicted roll, pitch and yaw to yield a prediction of a true attitude of the antenna with respect to geographical axes fixed relative to the Earth.

The prediction filter 800 may be implemented in various forms using technologies known in the art. For example the predictive filter 800 may be implemented as an application specific integrated circuit (ASIC) or may be implemented as a computer program loaded onto a general purpose computer platform.

The prediction filter 800 operates on the following basis:

a stream of data measurements are collected in real time describing the present orientation and motion of the ship and antenna in terms of pitch, yaw, roll and antenna rotation. This data arises from the antenna synchro, and the ship's compass. The movement of the ship has characteristic frequencies, and is therefore basically predictable about a mean value. An underlying mathematical model upon which the prediction filter is designed breaks down into various stages including, a first section which renders the raw motion data to have zero mean value. This is achieved by use of prior art mathematical techniques, including any one of a number of known smoothing algorithms, for example, a least squares polynomial fit to data, followed by averaging of the data to find the mean, and then subtracting that mean from the data set to obtain a zero mean data set.

The number of weighting coefficients in the auto-regressive prediction algorithm is optimally selected from a consideration of sea state information. Dynamics of ocean movement can be shown to have around 5 individual independent parameters. Hence, in the best mode, the selection of 5 individual rate coefficients. Since the dynamics of ocean conditions is the driving force for producing motion on the vessel, the characteristics of those dynamics are fed into the auto-regressive prediction algorithm as a selection of the number of weights applied.

An initial setting for the actual values of each of the weights (5 in the best mode) is obtained from a consideration of the actual motion of a vessel of a size and displacement similar to the vessel to which the prediction apparatus is to be fitted.

The auto-regression filters set values of the weights automatically as they receive data. The values of the weightings are continually adjusted as conditions change. In the best mode, the system can "learn a new ship" in a time of around 2 minutes. Whilst in the best mode, it has been found that five individual weights are optimum, this number of weights is particular to a specific type of vessel which has been studied. For other vessels which are different from the actual ship studied, an optimum number of weights may differ from five. In the case of a Marple filter, this automatically chooses an optimum number of weighting terms. In the case of the Burg filter, the number of weights must be manually set.

The dynamics of the ocean state arises from the physics of movement of water, and is pre-known information.

The prediction filter "learns" about the motion of the ship, through the mechanism of generation of the weighting coefficients derived by and used by the auto-regressive algorithm. Therefore, for an auto-regressive prediction algorithm where the weighting coefficients are initially trained on data from a first ship, when the motion prediction apparatus is fitted to a second ship, of slightly different characteristics, the apparatus will learn about the new dynamics of the second ship, by inputting the motion data of that ship, and generating or modifying new weighting coefficients which are applied to the auto-regressive prediction algorithm.

The constant rolling window of 50–100 data points is fed into the auto-regression prediction algorithm periodically, for example every second or so, (using a prior art auto-regression algorithm, either a Burg algorithm or a Marple algorithm), the auto-regression prediction algorithm attempts to find a best fit data using the weighting coefficients, and then using that fit to extrapolate from the motion data into the future a predicted motion data for a particular parameter, either yaw, pitch, roll, or rotation.

Data from the ship's motion is fed in to generate auto-regressive weighting coefficients, which are then used in an auto-regressive prediction algorithm to predict forward a motion data for each of pitch, roll, yaw and rotation data parameters for the ship.

Ship motion prediction data and antenna motion prediction data streams are combined to produce antenna attitude data in combiner 801.

Figure 9:
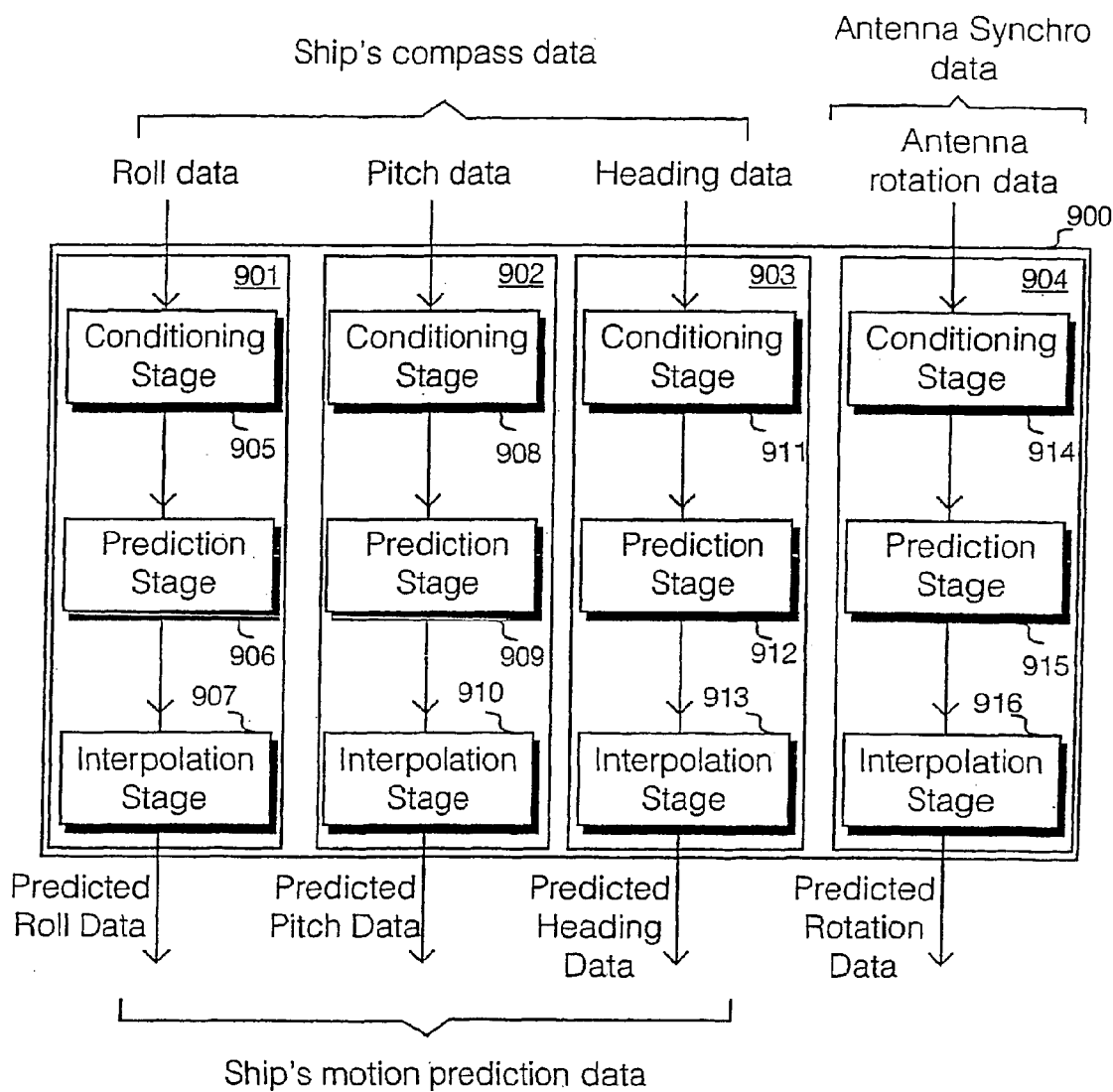
FIG. 9 illustrates schematically a predictive filter component for predicting movement of a vessel and a rotating antenna.

Referring to FIG. 9 herein, there is illustrated schematically predictive filter 900, comprising a plurality of compass filters 901–903 comprising a roll data filter 901, a pitch data filter 902 and a heading data filter 903. The predictive filter also comprises an antenna synchro data filter 904.

Roll data filter 901 inputs roll data from the ship's compass, and outputs predicted roll data. The roll data filter 901 comprises a conditioning stage 905, a prediction stage 906, and an interpolation stage 907.

Pitch data filter 902 inputs pitch data from a ship's compass, and output predicted pitch data. Pitch data filter 902 comprises a conditioning stage 908; a prediction stage 909; and an interpolation stage 910.

Heading data filter 903 inputs heading data from a ship's compass, and outputs predicted heading data. Heading data filter 903 comprises a conditioning stage 911 a prediction stage 912, and an interpolation stage 913.

Antenna rotation data filter 904 inputs antenna rotation data and outputs predicted antenna rotation data. Antenna rotation data filter 904 comprises a conditioning stage 914; a prediction stage 915; and an interpolation stage 916.

The three stages are further described as follows:

Stage One: Conditioning

Pre-calculated Savitsky-Golay weights of second order are applied to a moving data window of duration one second containing 100 samples. The window moves in one second steps so that none of the data is reused. The weighted samples are summed, and the data are thereby smoothed and the sampling rate is reduced from 100 samples per second to 1 sample per second.

The mean value of the smoothed data (1 s) samples, in the long (50 seconds) window is calculated and then subtracted from each datum.

In the case of synchro data i.e. antenna rotation data, this is decimated by a factor of 80.

The Savitsky-Golay filter has coefficients aj which are pre-calculated by a least squares polynomial fit. Its smoothed estimate of the $n^{th}$ datum is:

$$\hat{Z}_n = \sum_{j=1}^{m} a_j Z_{n+j-m}; M = 100; \quad n = 0, 1, 2$$

Stage Two: Prediction

The predictors are recursive auto-regression filters. An auto-regression filter comprises a digital filter for which the data model is of the form:

$$Z_{n+1} = \varepsilon_n + \sum_{j=1}^{m} a_{j+n-m} Z_{j+n-m}; \quad n = 0, 1, 2 \ldots$$

where $\varepsilon_n$ is the error, m is the order, the $a_{j+n-m}$ are coefficients and the $Z_{j+n-m}$ measurements. The coefficients are determined so that the mean square value of the error $\varepsilon_n$ over the training history is at a minimum.

Burg type filters are used for the compass data, and Marple type filters are used for the antenna synchro rotation data. The recursive auto-regression filters are only able to predict either one second ahead, or by recursion, an integer number of seconds.

The number of coefficients of the Burg auto-regression filters is predetermined. The auto-regression filters use 5 or 6 present and immediately past samples to estimate a single future sample.

Long data window averages are added to the predictions of each auto-regression filter in order to restore absolute values. The prediction step of the auto-regression filter is:

$$\hat{Z}_{n+1} = \sum_{j=1}^{m} a_{j+n-m} Z_{n+j-m}; \quad m = 5, 6$$

Stage Three: Interpolation

A scheduler can demand predictions for any time as measured in milliseconds. The motion predictor therefore extrapolates and interpolates within the one second predictions of the auto-regression filters by means of a three point Lagrange algorithm.

A Lagrange filter has pre-calculated coefficients according to an exact polynomial fit. The interpolation is:

$$\hat{Z}_{n+\Delta n} = \sum_{j=1}^{m} a_j Z_{n+j-m}; \quad m = 3; \; aj \text{ depends on } \Delta n$$

The antenna synchro filter and compass filters have the same basic layout. The synchro filter updates five times faster than the compass filters. A conditioning stage of the synchro filter produces smoothed estimates of rate as well as smoothed estimates of position.

Motion prediction is used as a sub routine for scheduling. For example, there is computed first and second derivatives of antenna angles by numerical differences. These are used to set up equations, the solutions of which are the bounds of a visibility interval for a given "look".

In practice, a rotation rate of the antenna varies slightly, and therefore variations in antenna rotation rate relative to the ship require prediction.

Figure 10:
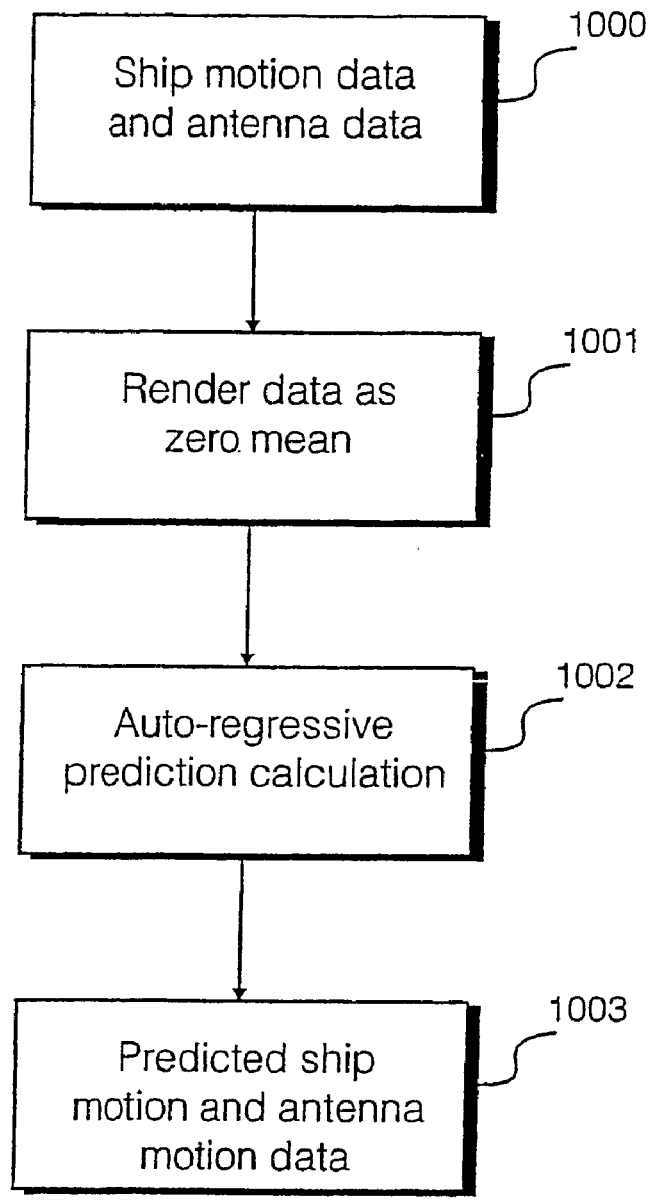
FIG. 10 illustrates schematically processing steps carried out by a predictive filter component of the motion prediction apparatus of FIG. 8.

Referring to FIG. 10 herein, there is illustrated schematically real time "on the fly" processes for processing ship's motion data and antenna position data to obtain a predicted ship's motion and antenna motion data 1001. The ship motion data, i.e. roll data, pitch data, yaw (heading) data, and the antenna rotation data are fed into a zero mean process, which gives rendered data having a zero mean value. The motion predictor draws 100 samples per second from each of the roll, pitch and heading channels of the ship's compass. The zero mean data is fed into an auto-regressive prediction algorithm 1002 which generates predicted ship's motion and antenna motion data in process 1003.

Figure 11:
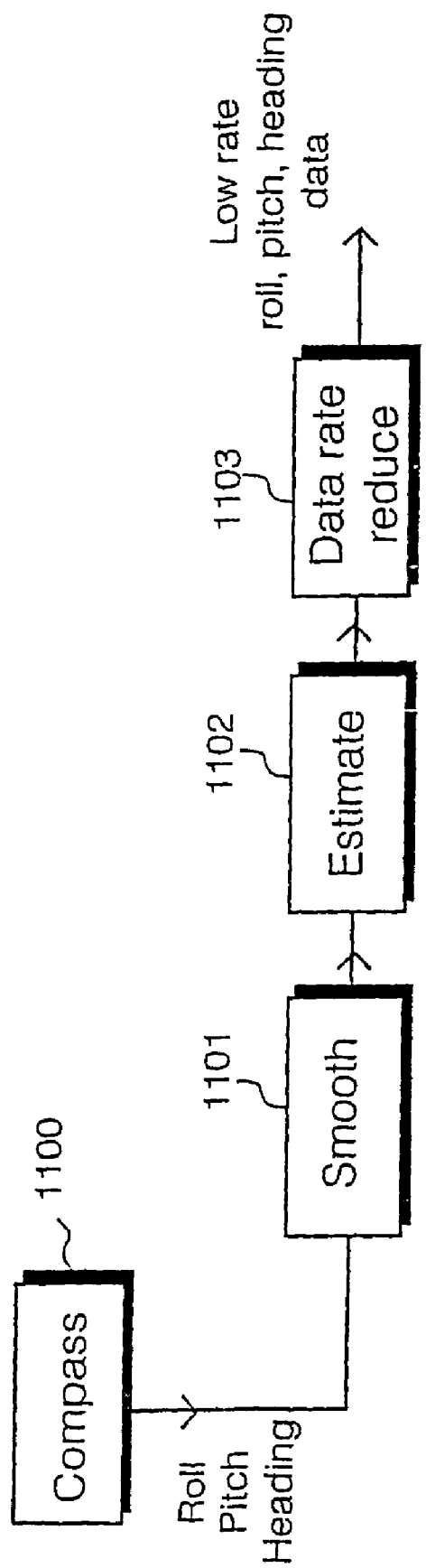
FIG. 11 illustrates schematically basic mathematical data processing stages for prediction of ship's motion from a roll, pitch, and heading data output from a compass.

Referring to FIG. 11 herein, there is illustrated schematically processing stages carried out on a channel in order to transform raw data from a compass into zero mean data suitable for processing by an auto-regressive predictor. The problem is that the raw data arrives at too high a sample rate, and is also subject to random noise. The raw data comprises roll data, pitch data, and heading data from the ship's compass. The polynomial filter carries out three tasks on the data from the compass. In process 1101, the data is smoothed. In process 1102 estimation and prediction of the roll, pitch and heading at the leading edge of the data window are estimated. In process 1103 the data rate of the smoothed and predicted data originating from the compass 1100 is reduced, resulting in data at a rate suitable for input into an auto-regressive predictor.

In a short window, data is smoothed and predicted to a single sample at the leading edge of that window. This is accomplished by a polynomial filter.

The window then steps to a full duration (long window) so that it contains only new data, and the process is repeated. In this way, the data rate is reduced, typically 50-fold and the samples are smoothed. Averaging is carried out on the long window containing typically 100 slow rate samples. The long window steps one sample at a time.

Figure 12:
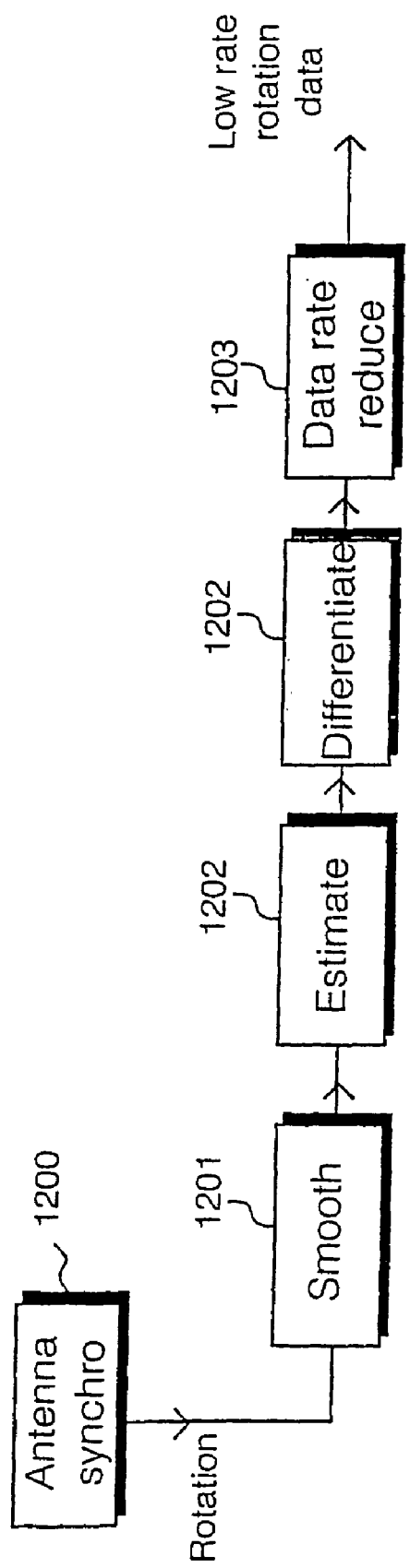
FIG. 12 illustrates schematically basic mathematical data processing stages for prediction of a rotation of an antenna, from a rotation data output from an antenna synchro.

Referring to FIG. 12 herein, there is illustrated schematically processing of rotation data output from an antenna synchro 1200. The rotation data from the antenna synchro undergoes 4 data processing stages comprising a smoothing stage 1201; an estimation stage 1202; differentiation of the rotation data output from the antenna 1203, and a data rate reduction stage 1204, resulting in zero mean data.

As with the roll, pitch and heading data output from the compass, the rotation data output from the antenna synchro is processed by smoothing the data in a short window and predicting the data to a single sample at the leading edge of the window using a polynomial filter. The window then steps to a full duration, so that it contains new incoming data, and the processes are repeated. In this way, the data rate is reduced typically 50-fold, and the samples are smoothed. Averaging is carried out on a long window, which typically contains 100 slow rate samples. The long window steps one sample at a time. The motion predictor draws 8292 samples per second from the antenna synchro.

The motion predictor supplies smooth predictions of the motion of the antenna axes with respect to the earth. The predictions are renewed at up to 5 times per second.

Figure 13:
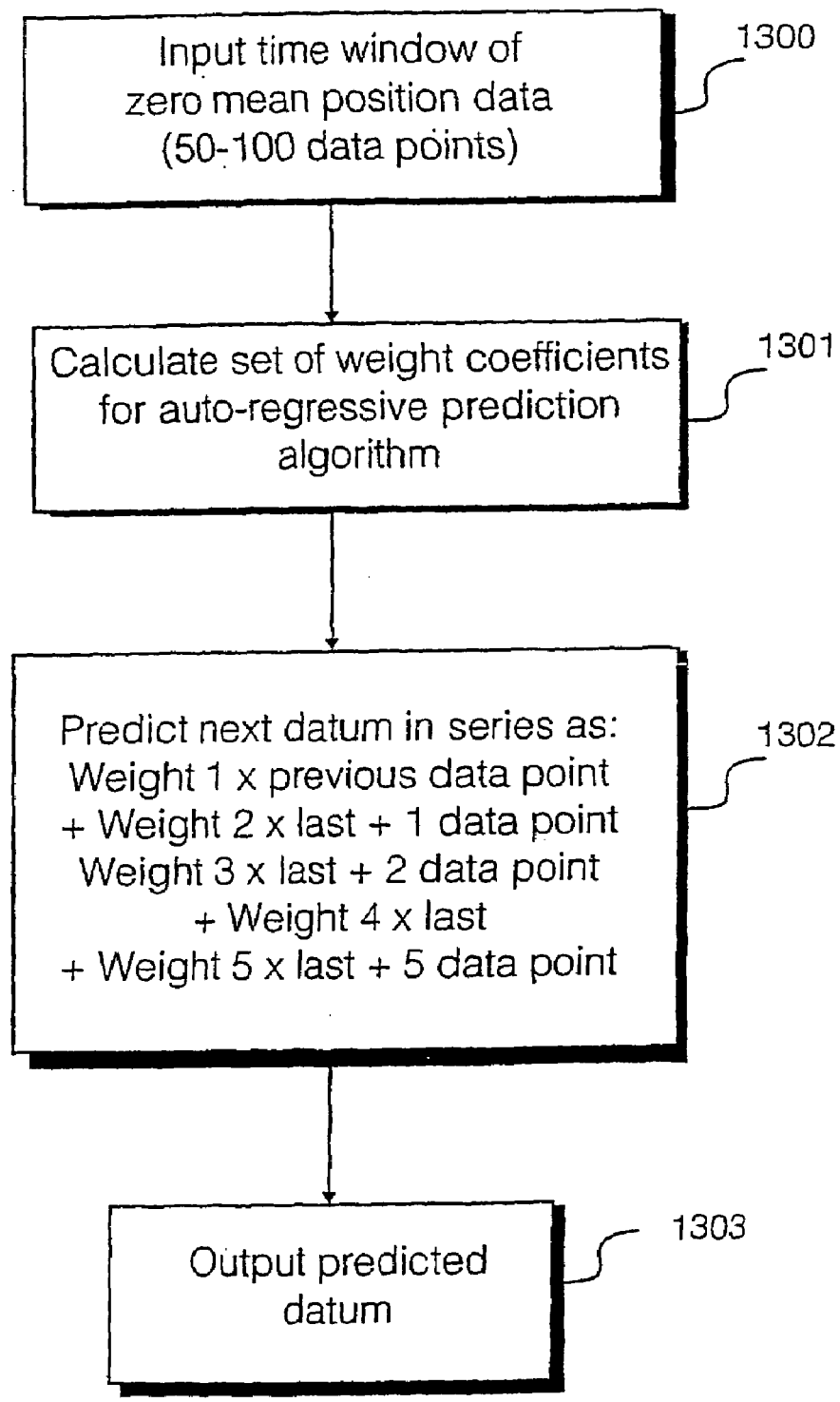
FIG. 13 illustrates schematically basic mathematical steps applied by the ship motion prediction system for obtaining a zero mean ship's motion data set.

Referring to FIG. 13, there is illustrated schematically step 1002 of operation of the auto-regressive prediction calculation. In step 1300, there is input a time window of zero mean position data points for each one of the parameters to be predicted, e.g. pitch data, yaw data, roll data, or rotation data. In step 1301, there is calculated a set of weight coefficients for the auto-regressive prediction algorithm from the input data points. Typically, a rolling time window of 50–100 data points will be input in order to calculate the set of weight coefficients. In the best mode implementation, 5 weight coefficients are calculated. In step 1302, the 5 weight coefficients calculated are applied to an auto-regressive prediction algorithm, which takes the previous data point and multiplies by the first weight, takes the previous plus one data point and multiplies it by the second weight, and so on up to the fifth weight, which is multiplied by the last but five data point. In process 1303 there is output a predicted datum.

In step 1300, in order to keep the amount of computation manageable, a time window for input of position data is selected to give a minimum number of data points which give weights which give an accurate prediction at the output of the auto-regressive prediction algorithm. However, the input time window must be long enough to capture all the characteristics of the motion data. In the best mode, the input time window is selected after consideration of accumulated historical data describing the motion of a plurality of various vessels of different size and displacement to obtain an optimized input time window, which is long enough to capture all motion modes of vessels, but short enough that no unnecessarily large amounts of motion data are collected. This may be achieved by looking at a fourier spectrum of previous ship motion data to identify periods within that motion, and then select a time window long enough to encapsulate at least one period of each mode of motion, depending upon the type of motion investigated. Such an analysis also enables assessment of the number of weightings to be applied to the auto-regressive prediction algorithm. The size of the input time window can be tailored to a particular size and displacement of vessel in order to optimize the motion prediction apparatus for that size and displacement of vessel by selecting weight coefficients having regard to historical motion movement of a vessel of a similar size and displacement to be vessel for which motion is to be predicted. Additionally, a time interval between successive time sample windows can be optimized from such an analysis.

Referring to FIG. 1400 herein, there is illustrated schematically functional components of the predictive filter 800.

The filter comprises two types of signal processing path. A first type of signal processing path receives roll, pitch and heading data from the ship's compass at a rate of 100 samples per second, corresponding to a Nyquist frequency of 50 HZ, and produces ship's motion prediction data.

A second type of signal processing path inputs antenna position data from the antenna synchro, the antenna position data being generated in the best mode, at a rate of 8000 samples per second which is sampled by the second signal path at a rate of 100 samples per second, corresponding to a Nyquist frequency of 50 HZ.

In the following description, each signal processing stage is carried out by a corresponding respective signal processing component implemented in known technology either as an ASIC or a specific area of an ASIC, or as a programming code component, for example in a known programming language such as C or C++.

In first smooth and reduce processing component 1400, the roll, pitch and heading data received from a ship's compass at 100 samples per second is smoothed by application of a second order polynomial filter, and the sampling rate is reduced, in the best mode to 2 samples per second. This filters out amplitude noise and time jitter from the compass data. The polynomial filter uses a one second data window for the input roll, pitch and heading data. The roll data, pitch data, and heading data are each input to the first smooth and reduce component 1400 in a separate signal processing channel through that component, so that three said second order polynomial filters are applied, one on each channel.

A travelling mean filter component 1401 computes the mean of the ship's data within a predetermined time window. In the best mode implementation, two samples per second are input into the travelling mean filter 1401, which operates a fifty second travelling window. The mean value from the travelling mean filter is then subtracted from every sample in the window by mean ship data zero component 1402. The practical effect of this is that heading data become yaw data, and any lack of trim is compensated for in subsequent calculation processing.

The output of the mean value subtraction stage 1402 is fed into a main prediction stage as follows:

The ship's data, (roll data, pitch data and yaw data relative to a fifty second mean) output from the zero mean value component 1402 are subject to a Burg algorithm component 1404 having five coefficients to train the algorithm. The algorithm is made to run starting with an earliest datum in the travelling window (fifty second window) and finishing with a latest datum. The coefficients are then deemed to be trained, and predictions are made in multiples of 0.5 seconds. As the travelling window moves, the training cycle begins again, following the movement of the training window. Burg algorithms are well known to those skilled in the art.

Often, a prediction is required for some intermediate time. This is achieved by a Lagrange [Joseph-Louis compte De L'empire] interpolation on three adjacent predictions, for example 0.5 seconds apart. Finally, the 50 second mean value is added to the interpolation to give an absolute value at a desired time. The yaw data then becomes heading data and any departure from trim is also represented.

The predictive roll, pitch and heading data are treated as Euler angles to construct a ship's rotation matrix data 1410. Any direction vector specified with respect to level ship coordinates, when multiplied by this matrix becomes a same vector specified with respect to ship centered coordinates.

By successive products with these matrices, a look direction is referred to the antenna centered coordinate axes.

The second signal processing channel is as follows:

A smooth and reduced rate component 1411 inputs the antenna position data at a rate of 100 samples per second as well as a system time data, obtained from a known clock. A second order polynomial filter comprising smooth and reduced rate component 1411 smoothes the antenna position data and reduces the antenna data rate to five samples per second. It also and provides smoothed samples of the angular velocity of the antenna also at five samples per second. The polynomial filters in the smooth and reduce rate component 1411 in the best mode herein use a one second window on data input.

A ten second moving window 1412 is applied to the antenna angular velocity data, output from the smooth and reduced rate component 1411. The average angular within this window is computed an then subtracted from each of the antenna angular velocity data at five samples per second. This process is required because the subsequent auto-regressive AR filters are designed only to process the zero-mean signal.

Component 1413 makes the antenna data have a zero mean. The antenna data (angular velocity relative to a ten second mean) are then input into a Marple algorithm component. The Marple algorithm is trained with respect to its ten second data window in a similar manner to the training described herein above for the Burg algorithm. The difference is that the Marple algorithm decides on the optimum number of coefficients automatically. The number derived is usually 5 or 6.

The Marple filter calculates the number of weighting coefficients required itself to minimize the data time window.

Prediction of antenna position in prediction component 1415 is made in two steps. Using the auto-regression coefficients from the Marple algorithm, and the mean position and velocity data, starting from the time and angle of the ship's previous fore-aft datum, the predicted antenna position is computed using a linear law. A correction is calculated by integrating the auto-regression predicted velocity differentials over the same interval. Three point Lagrange interpolation is applied as required.

The predicted antenna position data 1420 forms an output of the predictive filter.

Figure 14:
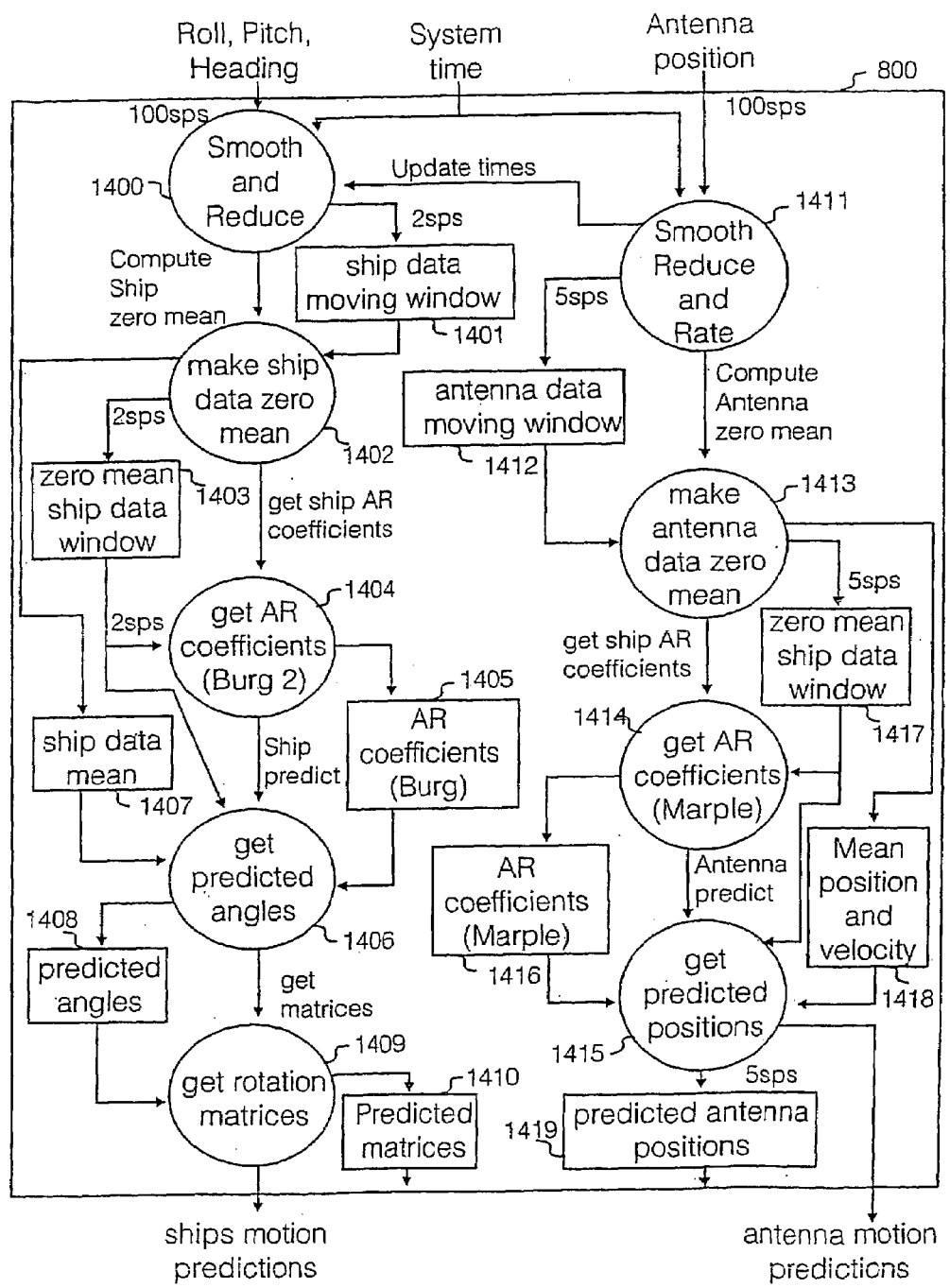
FIG. 14 illustrates schematically basic mathematical steps carried out by the prediction apparatus for applying an auto-regressive prediction algorithm to zero mean ship's motion data.

Construction of the rotation matrices 1409 may be carried out as a separate module from the prediction filter, but is shown in FIG. 14 within the prediction filter for convenience.

Figure 1:
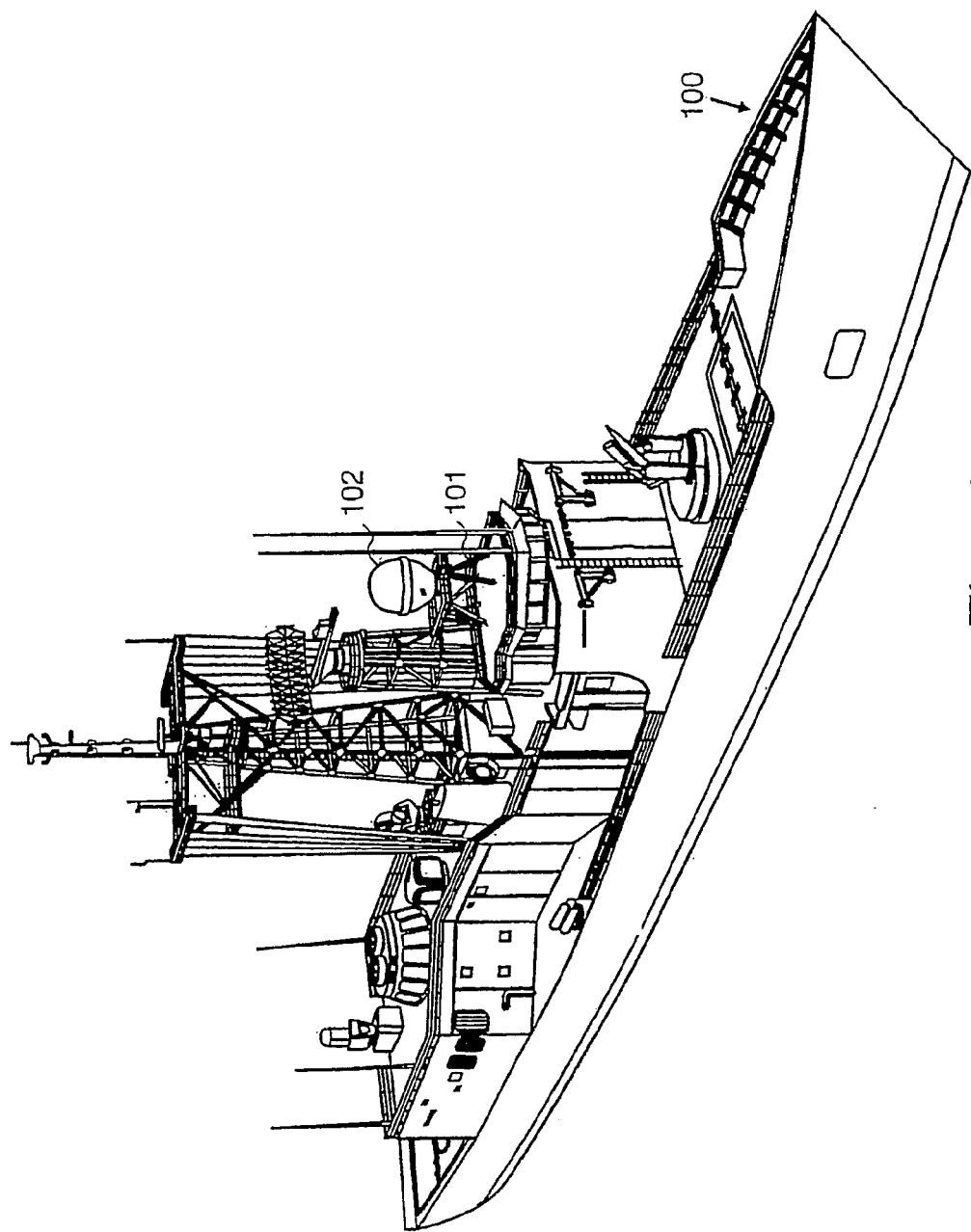
FIG. 1 illustrates schematically in perspective view, a ship having a radome containing a rotating antenna, as is known in the prior art.
Figure 2:
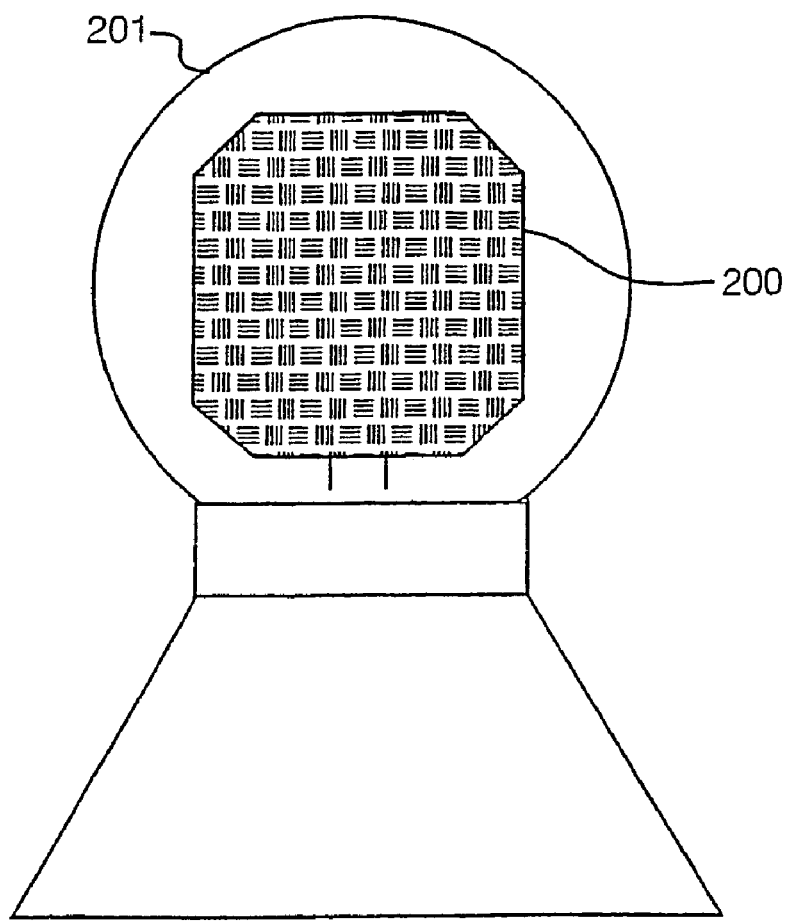
FIG. 2 illustrates schematically a prior art rotating antenna aperture.
Figure 3:
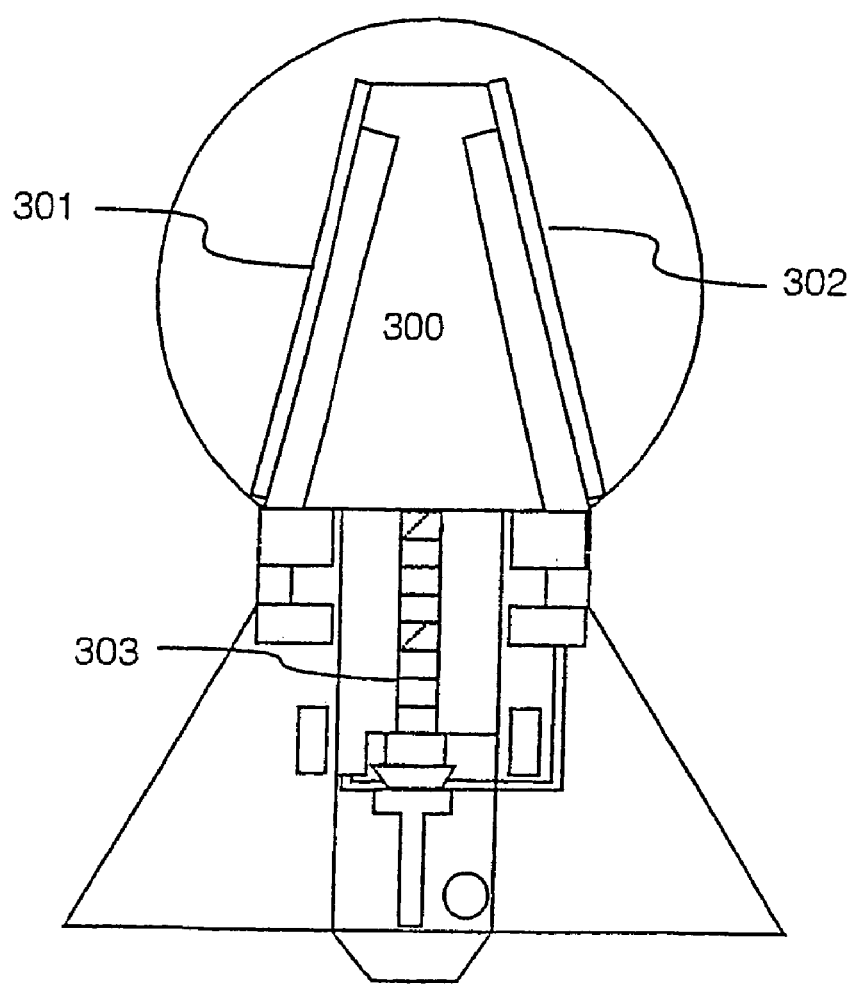
FIG. 3 illustrates schematically in cutaway view internal components of the rotating antenna of FIG. 2, illustrating first and second oppositely facing antenna apertures rotating about a central axle.
Figure 5:
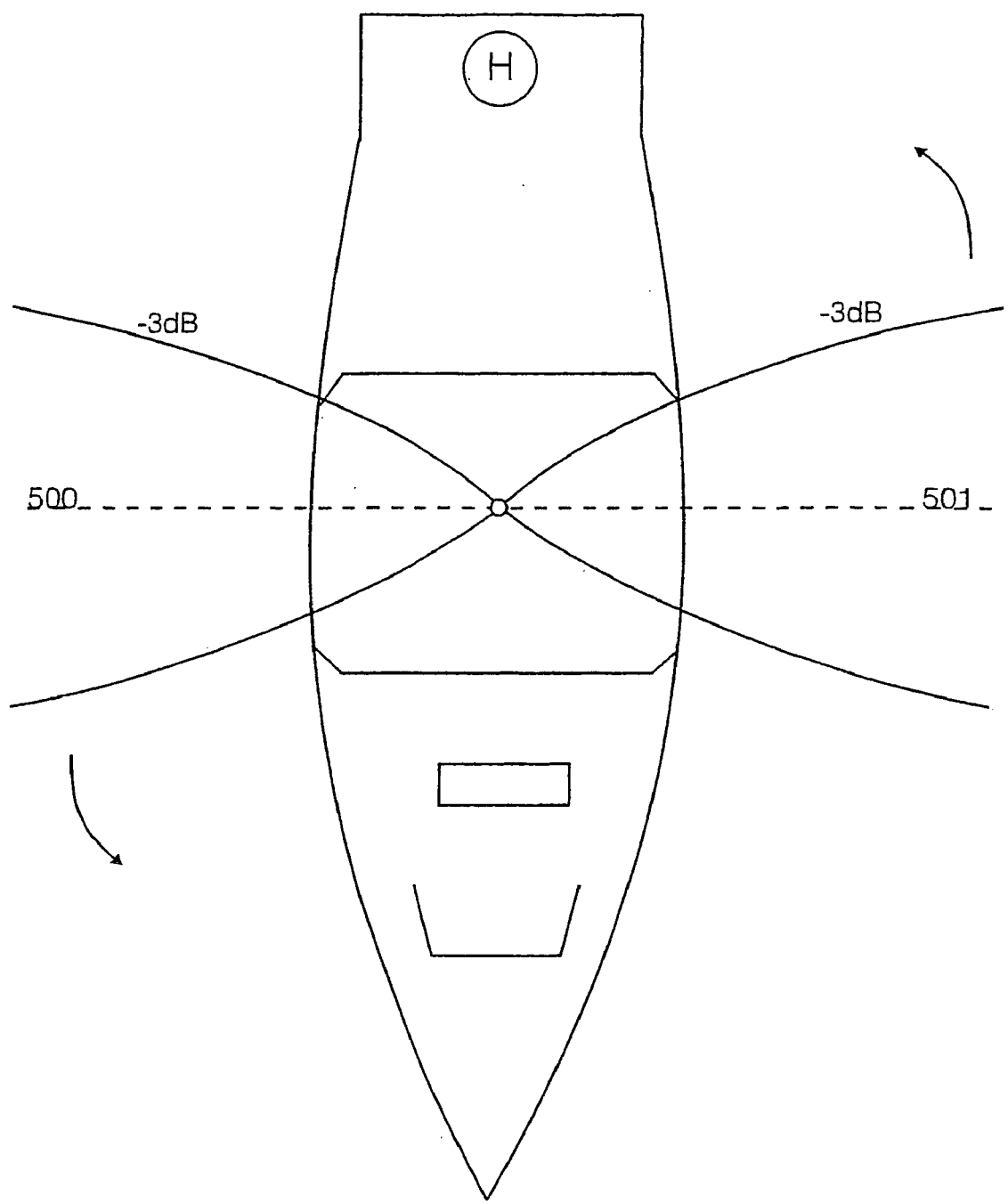
FIG. 5 illustrates schematically from above, a rotating beam pattern and look directions of the prior art antenna illustrated in FIGS. 1–3.
Figure 6:
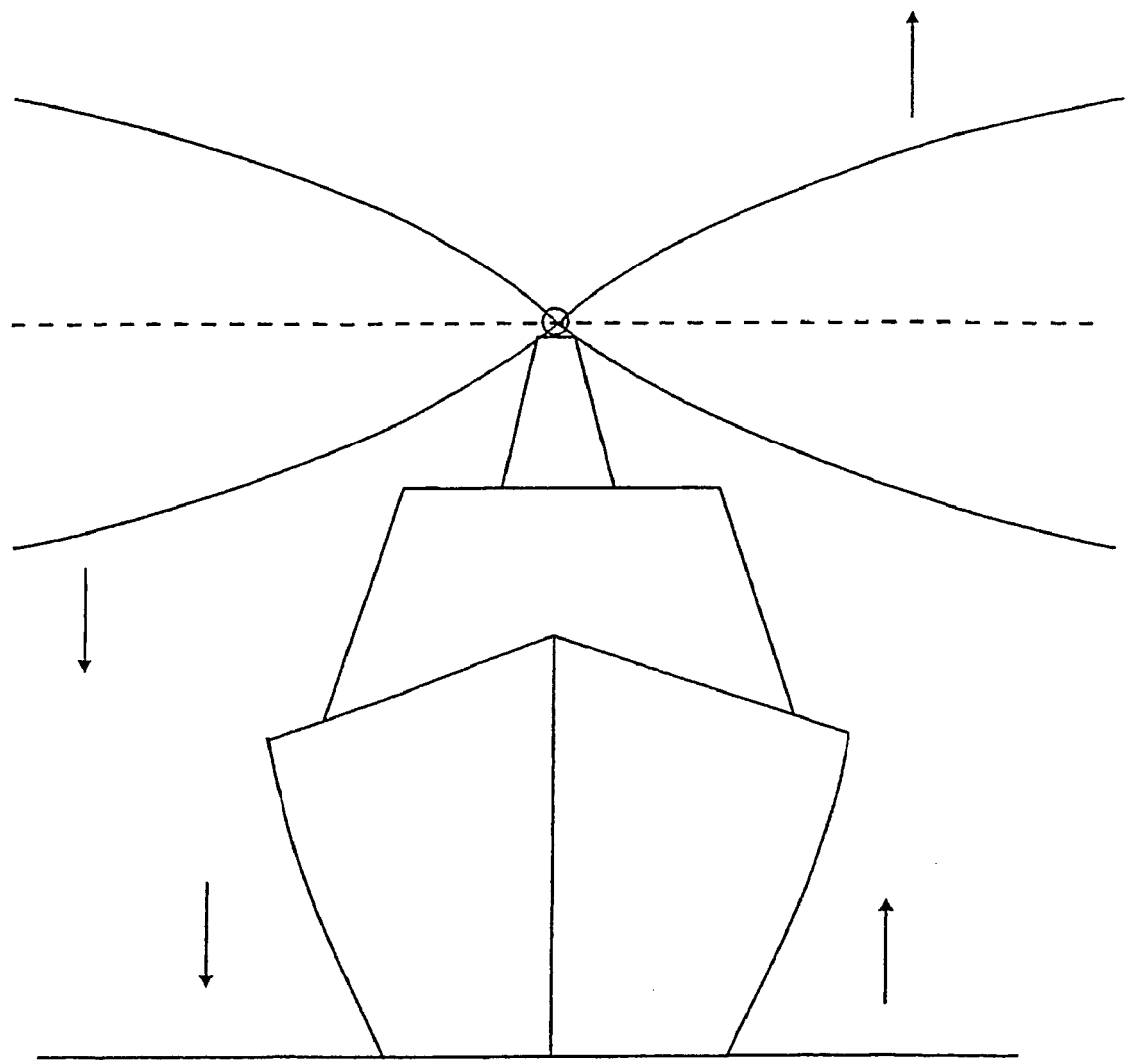
FIG. 6 illustrates schematically in a view from a ship, a beam pattern produced by the rotating antenna of FIGS. 1–4.
Figure 7:
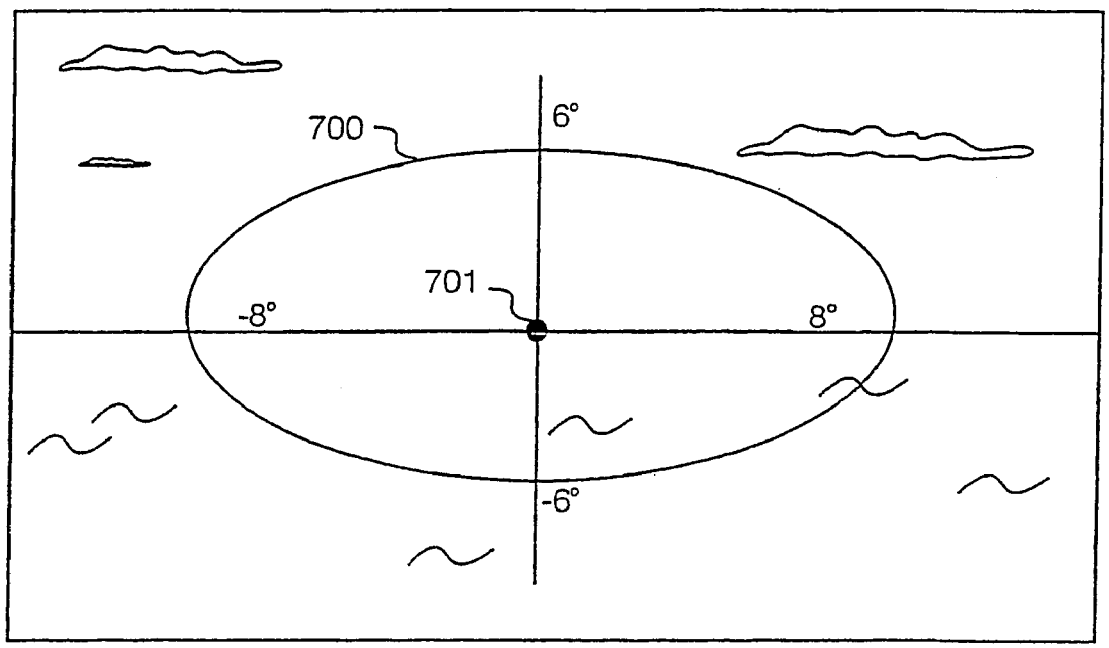
FIG. 7 illustrates schematically a range of variations from an ideal look direction along a beam of one antenna aperture, where variations in look direction are caused by movement of the ship with respect to a true horizontal earth's surface.
Figure 15:
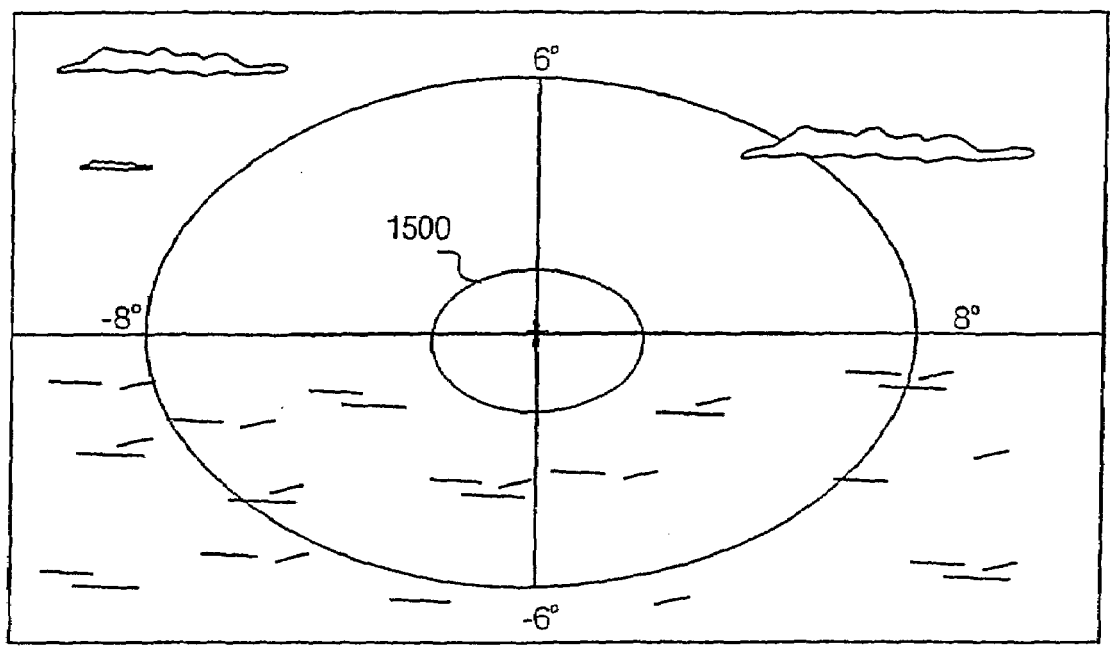
FIG. 15 illustrates schematically a comparison of a corrected look direction of an antenna aperture after applying correction data output from the motion prediction system of FIG. 8.

Referring to FIG. 15 herein, there is illustrated schematically an example of performance of a best mode implementation prediction filter, is as follows. Assuming a stationary radar target is observed along a boresite of the antenna at the origin, then if prediction is based only on an assumption that the antenna rotates at its nominal rotation rate, then five seconds later, the target will appear anywhere within the larger ellipse as shown in FIG. 7, (i.e. when the prediction filter is not operating.)

However, if the prediction filter is operational, then the uncertainty in the target position is reduced, as viewed down the bore sight of the antenna to the smaller ellipse 1500 as shown in FIG. 15 herein. The smaller ellipse 1400 is based upon measurements of a specific implementation on board a ship sailing in sea-state six. The ellipses represent a single standard deviation in each case.

The polynomial based filters multiply the data array with a fixed matrix of pre calculated weights. They can thereby smooth, interpolate, extrapolate, decimate, and differentiate on a number of channels, and use short data windows in the best mode, of 0.5 to 1 seconds. The travelling mean filters also belong to this class and use long data windows, in the best mode in the range ten to fifty seconds. The auto-regressive filter slowly adjust the weights with history and can only predict one sample ahead. The auto-regressive filters use moderate data windows of for example five or six samples for prediction, and long data windows of for example (fifty samples) to train the weights. The polynomial filters, although capable of prediction are unsuited to quasi oscillatory signals, i.e. ship motion and antenna angular velocity. Their role is therefore confined to conditioning on short data windows. The auto-regressive filters by contrast are ideally suited to long term prediction of quasi oscillatory signals.

Limitations of the learning filters are as follows:

The learning filters can predict only those variables that are measured, for example roll, pitch heading and antenna rotation. In contrast, a prior art extended Kalman filter can predict variables that are not measured, but which are part of a model, for example serge, crab and heave. However, in many applications estimates of serge, crab and heave are not necessary.

In the best mode, because a single channel filter is allocated to each degree of freedom the filters are independent of each other, so that the total number of coefficients is larger than if a single many-in many-out coupled filter were used. In consequence, the independent filters are likely to be more vulnerable to noise than a coupled filter. A coupled filter would be much more complicated to implement and may require more data processing. Nevertheless, a coupled filter could offer a margin of performance in any application for which current performance provided by single channel filters allocated to each degree of freedom, proves inadequate.

The auto-regressive filters in the best mode herein, are implemented by either a Burg or a Marple recursive algorithm. These algorithms are arithmetically efficient and statistically stable, but have the potential disadvantage, that if they are allowed to run too long, they can suffer arithmetical instability due to rounding. This problem is overcome in the best mode implementation by training the coefficients on a data window not exceeding fifty samples. The training restarts each time the long window moves, in the best mode at intervals of 0.2, 0.5 or one second.

The invention claimed is:

1. A method of predicting an orientation of a vessel, said method comprising the steps of:
   inputting roll data describing a roll of said vessel;
   inputting pitch data describing a pitch of said vessel;
   inputting heading data describing a heading of said vessel;
   applying a travelling mean window to said roll data, pitch data and heading data to obtain a time moving average roll data, time moving average pitch data; and time moving average heading data;
   filtering any offset data of said time moving average roll data, time moving average pitch data and time moving average heading data, such that said time moving average roll data, pitch data and heading data has a zero mean value;
   applying an auto-regression process to said zero mean time moving average roll data, pitch data and heading data;
   predicting angles of movement of major three dimensional X, Y and Z axes of said vessel from an output of said auto-regression process, and said mean roll data, pitch data and heading data; and
   storing a result of said predicted angles as a set of rotation matrix data.

2. The method as claimed in claim 1, further comprising the steps of:
   inputting an antenna position data describing a rotational position of an antenna;
   inputting an antenna velocity data describing a rotation rate of said antenna; and
   smoothing said antenna position data and antenna velocity data by processing said antenna position data and said antenna velocity data through a polynomial filter.

3. The method as claimed in claim 2, wherein said polynomial filter uses a time window in the range 0.5 to 2 seconds.

4. The method as claimed in claim 2, comprising the step of applying a travelling mean filter to said antenna position data and said antenna velocity data.

5. The method as claimed in claim 2, comprising the step of applying a travelling mean filter to said antenna position data and said antenna velocity data, by computing a mean value of said data within a time window in the range 25 to 100 seconds.

6. The method as claimed in claim 2, comprising generating a predicted antenna velocity data by applying a Marple algorithm to said antenna velocity data.

7. The method as claimed in claim 1, wherein said step of prediction of angles of movement comprises the steps of:
   starting from a time and angle of said vessel's previous fore-aft datum, computing a position of said vessel with a linear law using a data window mean velocity; and
   adding a correction calculated by integrating an auto-regression predicted velocity differential over a same time interval as said data window.

8. The method as claimed in claim 1, further comprising the step of:
   applying a three point Lagrange interpolation.

9. A method of predicting a true orientation of an antenna, said antenna rotatably mounted on a vehicle, said method comprising the steps of:
   inputting a stream of antenna rotation data describing a current measurement of a rotational position and rotational velocity of said antenna with respect to said vehicle;
   applying a moving time window sample to said antenna rotation data to obtain a time moving average antenna rotation data;
   filtering any offset data of said time moving average antenna rotation data, such that said time moving average antenna rotation data has a zero mean value;
   applying auto-regression to said zero mean time moving average antenna rotation data;
   predicting a mean antenna rotation data;
   predicting an orientation of major three dimensional X, Y and Z axes of said vehicle; and
   storing a result of said predicted vehicle orientation and predicted antenna rotation as a set of rotation matrix data, said rotation matrix data describing a predicted antenna position in relation to a set of geographical axes fixed relative to the earth.

10. The method as claimed in claim 9, comprising smoothing said antenna rotation data by processing said antenna rotation data through a polynomial filter.

11. The method as claimed in claim 10, wherein said polynomial filter uses a time window in the range 0.5 to 2 seconds.

12. The method as claimed in claim 9, wherein said step of applying a moving time window sample to said antenna rotation data comprises:
   computing a mean value of said data within a time window in the range 25 to 100 seconds.

13. The method as claimed in claim 9, comprising predicting an antenna velocity data by applying a Marple algorithm to said antenna velocity data.

14. An apparatus for predicting an orientation of a vessel, said apparatus comprising:
   a roll data generator for generating roll data describing a roll of said vessel;
   a pitch data generator for generating pitch data describing a pitch of said vessel;
   a heading data generator for generating heading data describing a heading of said vessel;
   a sampler for applying a moving time window sample to said roll data, pitch data and heading data to obtain a time moving average roll data, pitch data and heading data;
   at least one filter for filtering any offset data of said time moving average roll data, pitch data and heading data, such that said time moving average roll data, pitch data and heading data has a zero mean value;
   at least one auto-regressor for applying auto-regression to said zero mean time moving average roll data, pitch data and heading data;
   at least one angle predictor for predicting angles of movement of major X, Y and Z three dimensional axis of said vessel from an output of said auto-regression, and a mean roll data, pitch data and heading data; and
   a memory device for storing a result of said predicted angles as a set of rotation matrix data.

15. An apparatus for predicting an orientation of a rotating antenna mounted on a vessel, said apparatus comprising:
   an antenna position data generator for generating an antenna rotation position data;
   a sampler for applying a moving time window sample to said antenna position data to obtain a time moving average antenna position data;
   at least one filter for filtering any offset data of said time moving average antenna position data, such that said time moving average antenna position data has a zero mean value;
   at least one auto-regressor for applying auto-regression to said zero mean time moving average antenna position data;
   at least one predictor for predicting a mean antenna position data; and
   a memory device for storing a result of said predicted mean antenna position data as a set of rotation matrix data.

16. An apparatus for predicting an orientation of an antenna said apparatus comprising:
   an antenna velocity data generator for generating an antenna velocity data;
   a sampler for applying a moving time window sample to said antenna velocity data to obtain a time moving average antenna velocity data;
   at least one filter for filtering any offset data of said time moving average antenna velocity data such that said time moving average antenna velocity data has a zero mean value;
   at least one auto-regressor for applying auto-regression to said zero mean time moving average antenna velocity data;
   at least one predictor for predicting a mean antenna velocity data; and
   a memory for storing a result of said predicted mean antenna velocity data as a set of rotation matrix data.

17. An apparatus for predicting an orientation of a vessel, said apparatus comprising:
   a roll data generator for generating roll data describing a roll of said vessel;
   a pitch data generator for generating pitch data describing a pitch of said vessel;
   a heading data generator for generating heading data describing a heading of said vessel;
   a sampler for applying a moving time window sample to said roll data, pitch data and heading data to obtain a time moving average roll data, pitch data and heading data;
   a filter for filtering any offset data of said time moving average roll data, pitch data and heading data, such that said time moving average roll data, pitch data and heading data has a zero mean value;
   an auto regressor for applying auto-regression to said zero mean time moving average roll data, pitch data and heading data;
   an angle predictor for predicting angles of movement of major X, Y and Z three dimensional axes of said vessel from an output of said auto-regression, and a mean roll data, pitch data and heading data;

a memory device for storing a result of said predicted angles as a set of rotation matrix data;

an antenna rotation data generator for generating an antenna rotation data;

a sampler for applying a moving time window sample to said antenna rotation data to obtain a time moving average antenna rotation data;

at least one filter for filtering any offset data of said time moving average antenna rotation data such that said time moving average antenna rotation data has a zero mean value;

at least one auto-regressor for applying auto-regression to said zero mean time moving average antenna rotation data;

at least one predictor for predicting a mean antenna rotation data; and a memory device for storing a result of said predicted mean antenna rotation data as a set of rotation matrix data.

* * * * *